United States Patent [19]
Perry

[11] Patent Number: 5,054,747
[45] Date of Patent: Oct. 8, 1991

[54] SCRAP RECOVERY APPARATUS
[75] Inventor: Ophneil H. Perry, Kingswinford, England
[73] Assignee: Stein Atkinson Stordy Limited, England
[21] Appl. No.: 500,676
[22] Filed: Mar. 28, 1990
[30] Foreign Application Priority Data
Mar. 28, 1989 [GB] United Kingdom ............... 8906936
[51] Int. Cl.⁵ .............................................. C22B 7/04
[52] U.S. Cl. .................................... 266/205; 266/901
[58] Field of Search ................. 266/205, 901; 75/401, 75/403

[56] References Cited
U.S. PATENT DOCUMENTS 3,550,925 12/1970 Evans et al. ........................... 75/401
4,299,376 11/1981 Weiss .................................. 268/205
4,498,523 2/1985 Bowman et al. ....................... 75/401
4,517,016 5/1985 Herter ................................... 75/401
4,548,651 10/1985 Ramsey ................................ 75/403

Primary Examiner—S. Kastler
Attorney, Agent, or Firm—Learman & McCulloch

[57] ABSTRACT

Apparatus for sorting and recovery of scrap material, particularly aluminum beverage can scrap, includes a rotary kiln (10) in which the raw scrap is heat processed to leave a furnace chamber (12) of the kiln as a mix of large particles of a first composition (e.g. larger pieces of soft aluminium alloy can body) and substantially smaller particles of a second and different composition (e.g. aluminium/manganese alloy can top fines). The output end of the kiln is provided with an axially extending screen section (30) to separate the larger particles from the small immediately adjacent to the chamber so that they cn be passed immediately without substantial loss of heat to a melting furnace (38).

9 Claims, 1 Drawing Sheet

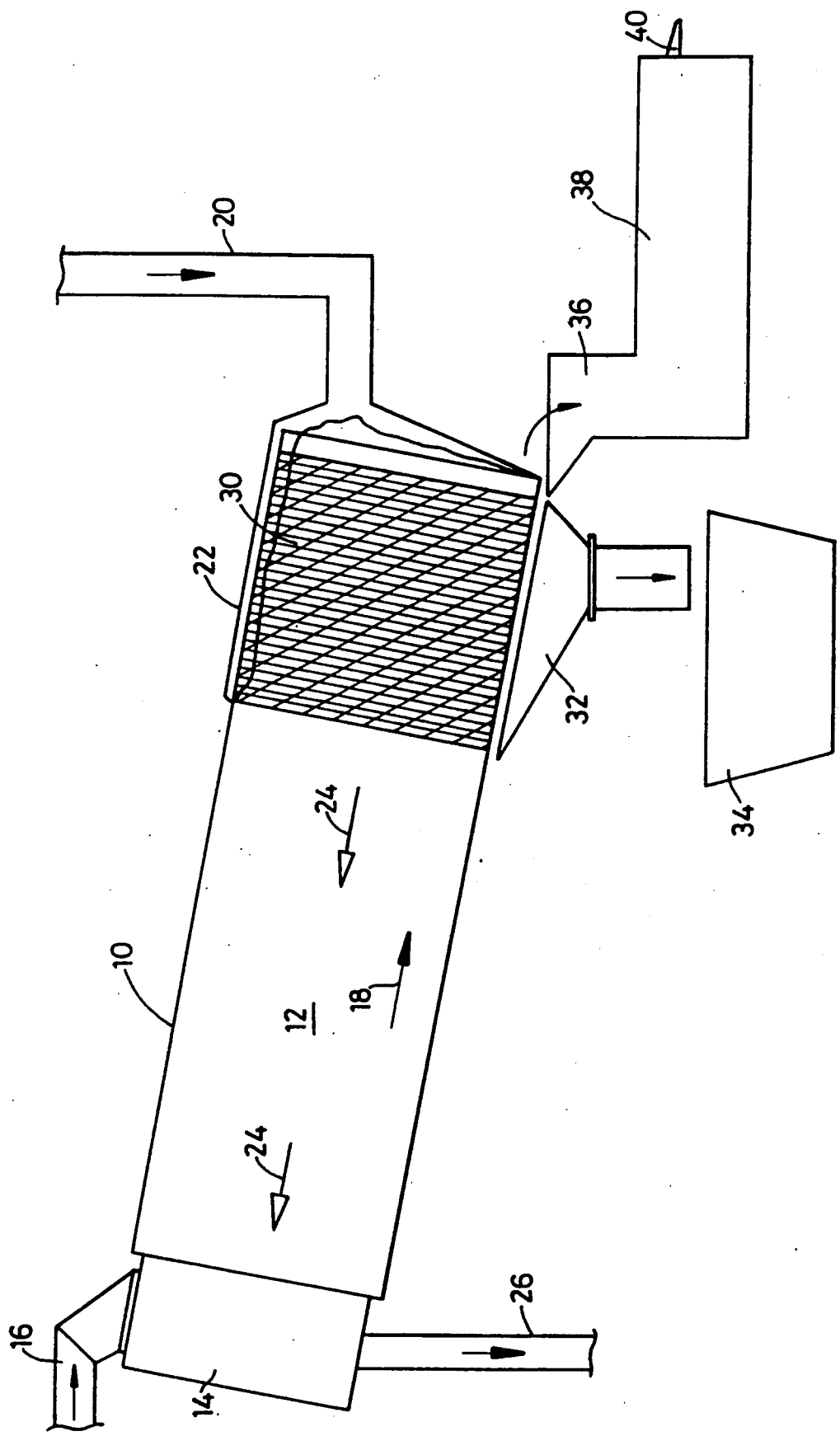

SCRAP RECOVERY APPARATUS

This invention relates to apparatus for heat processing of scrap materials in the recovery and sorting of their useful constituents and removal of unwanted contaminants. The invention is particularly but not exclusively applicable to scrap metal materials, for example in the recycling of metal containers particularly aluminium or aluminium alloy beverage cans.

BACKGROUND OF THE INVENTION

The invention may advantageously be combined with heat processing apparatus operating to remove as by vaporisation or burning contaminants such as lacquer or paint coatings from the material as described and claimed copending application Ser. No. 07/500,681, filed Mar. 28, 1990.

The object of the invention is to provide apparatus for recovery and storing of scrap materials which is particularly efficient and economical in operation, substantially reducing the heat energy needed for processing, and which is simple and compact in construction.

SUMMARY OF THE INVENTION

According to the invention there is provided apparatus for sorting and recovery of scrap material including a rotary kiln defining a furnace chamber having a feed path extending therethrough from a material input end of the kiln along which a continuous flow of the material is passed in use, means for heating the kiln to a temperature at which heat processing of the material as by vaporisation or burning of contaminants such as lacquer or paint coatings is effected, the material leaving the furnace in use being a mix of large particles having a first composition and substantially smaller particles having a second and different composition characterised in that the rotary kiln is provided with an axially extending screening section at the end remote from the material input for effecting separation of the material of said different compositions immediately adjacent to the furnace chamber into separate outflows for immediate further processing of one or both said outflows as by melting with minimum loss of heat in their transfer from said chamber.

In some cases said mix may have been formed or provided prior to entry of said flow of material into said chamber; in other cases as in the processing of aluminium beverage can scrap the formation of said mix will take place as a result of the heating within said chamber.

Preferably, for the latter process, the operating temperature within at least a region of the chamber will exceed 565°C. (1050° F.) so as to cause the softer high aluminium content alloy used for beverage can bodies to separate from harder aluminium/manganese alloy used for the can tops, said heating causing the latter to form into small (approximately 5–6 mm diameter) spheroids (referred to as "fines") while the softer aluminium alloy is in the form of substantially larger lumps, the mix being separated in the screening section, the fines dropping through the screening section walls and the larger more pure aluminium portions passing along the screening section for discharge from its end.

It is contemplated that the latter will leave the screening section with little loss of heat after exiting from the kiln chamber, their temperature may remain at around or just below 540° C. (1000° F.) and if they are delivered immediately from the screening section to a melting furnace (which will operate at approximately 700° C. (1300° F.)) it will be seen that the energy requirement of the latter will be substantially reduced and there will be minimum wastage of heat.

THE DRAWING

An example of the invention is now further described with reference to the accompanying drawing being a diagrammatic side elevation of an aluminium beverage can scrap recovery plant.

DETAILED DESCRIPTION

The plant includes a rotary kiln 10 defining an enclosed furnace chamber 12. The axis of the kiln is inclined so that the scrap material, fed through an input cowling 14 at one end thereof from a conveyor 16 passes through chamber 12 from left to right as viewed in the drawing along a feed path indicated generally by arrow 16, exiting from the kiln lower end as further described hereafter.

The plant further includes gas circulation means, preferably as detailed in our said copending Patent Application to which reference is made for further detail. Said means includes an inlet duct 20 having its downstream end connected to the lower end of chamber 12 by way of cowling 22 (shown cutaway in the drawing) in surrounding relationship to the lower end of kiln 10, hot gases at controlled temperature being fed through chamber 12 in the direction of arrows 24, i.e. in contra-flow to the direction of material feed therethrough, to exit from input cowling 14 by way of an outlet flue 26 along with the vaporised lacquer and other residues of the contaminants. The gas is preferably circulated by an exhaust fan operating in the outlet flue 26 so that the gases are drawn from chamber 12 by suction maintaining it at negative pressure, i.e. a gas pressure below that of the ambient atmosphere.

As referred to above the operating temperature within chamber 12 is such that the shredded can scrap separates into a mix of large pieces of the soft aluminium alloy can bodies having high aluminium content and fines i.e. smaller particles of the harder aluminium/manganese alloy can tops. The effect of the heating in chamber 12 is such that even those shreds of the material which include the swaged seam connecting the tops to the bodies will split and separate into the two different alloys.

The mix of large and small particles so created passes axially from the kiln as it rotates into a screening section 30 which is an axial extension of the kiln body having mesh or other perforate wall structure of a gauge such that the fines will drop therethrough but the larger pieces of soft aluminium alloy are carried on to the extreme end remote from the input cowling 14.

The fines, dropping through screening section 30 are collected by a hopper 32 below that section to accumulate in a bin 34 for subsequent further processing, or they may be fed directly to a conveyor which will carry them to processing means.

The larger soft aluminium portions drop from the end of screening portion 30 directly into a chute 36 leading then immediately into a melting furnace 38 for melting and refining the scrap metal, the furnace being tapped at 40 for casting the melt into bars or ingots ready for further refining and recycling.

In known apparatus of this type the mix of fines and larger portions is taken from the rotary kiln or other heat processing means (which is not provided with the screening portion 30) by a conveyor or the like and then has to be riddled or otherwise processed to separate the fines before the soft aluminium content can be taken on to a melting furnace. The transport distance and time involved in this intermediate process spaced from the furnace output results in substantial loss of heat so that much more energy is required to run the melting furnace.

With the use of the invention the material is sorted immediately on its exit from the furnace proper and in a region which is still maintained at substantial heat by the incoming gases from duct 20. Thus the soft aluminium content enters chute 36 at almost the temperature of its exit from chamber 12 e.g. about 540° C. (1000° F.). The melting furnace will probably operate at a temperature of about 700° C. (1300° F.) and it will be seen that much more efficient operation is ensured in that much less heat is required for attaining the melting temperature of the incoming material (with conventional methods the material may reach the melting furnace at a temperature as low as 250° C. or thereabouts).

Plant incorporating the invention is also much more compact than conventional plant particularly if the kiln 10 and associated gas circulating arrangements are as described in our said copending Patent Application enabling a kiln with a much shorter length of chamber 12 to be utilised, i.e. the screening section 30 occupies the space which would otherwise be taken up by a conventional longer kiln.

The higher energy efficiency and effective processing of the preferred form of plant gives rise to substantial economies so enabling the recycling to be carried out at less cost and therefore making scrap recycling and recovery commercially attractive as well as being most desired from the environmental point of view.

I claim:

1. Apparatus for sorting and recovering scrap material in solid form having metallic constituents of different compositions, said apparatus comprising:
   a) a kiln defining a furnace chamber having a material feed path extending therethrough from a material input end of the chamber to a material outlet end remote from the input end;
   b) means for heating the chamber to a temperature at which metallic constituents therein separate from one another into solid particles of different sizes;
   c) means for maintaining a subatmospheric pressure in said chamber;
   d) separating means immediately adjacent the material outlet end of said chamber for separating the metallic constituents into relatively larger and relatively smaller particles; and
   e) a melting furnace immediately adjacent but beyond the separating means for receiving and melting the relatively larger particles with minimum heat loss from said larger particles during their passage from said chamber to said furnace.

2. Apparatus according to claim 1 wherein the means for heating said chamber comprises a forced flow of hot gases from a source external of said chamber and in contra-flow to the feed path.

3. Apparatus according to claim 1 wherein the means for maintaining a subatmospheric pressure in said chamber comprises an exhaust fan adjacent the input end of the kiln.

4. Apparatus according to claim 1 wherein the means for helping said chamber has the capacity to heat said chamber in the region of its material outlet to a temperature in excess of 565° C.

5. A method of sorting and recovering in solid form scrap material having metallic constituents of different compositions, said method comprising:
   a) moving said material through a kiln chamber along a path from an input end of said chamber to an outlet end of said chamber;
   b) heating material in said chamber to a temperature at which the different metallic constituents separate from one another into solid particles of different sizes;
   c) maintaining a subatmospheric pressure in said chamber as said material traverses said path;
   d) separating particles discharged from said outlet end of said chamber into relatively larger and relatively smaller particles; and
   e) melting the relatively larger particles substantially immediately upon their discharge from the outlet end of said chamber, thereby avoiding substantial loss of heat from said relatively larger particles between their discharge from said chamber and their melting.

6. The method according to claim 5 wherein the heating of said material in said chamber is effected by flowing hot gases through said chamber from a source external of said chamber and in contra-flow to the movement of said material through said chamber.

7. The method according to claim 5 wherein the material in said chamber is heated to a temperature such that the relatively larger particles discharged from said chamber have a temperature of about 540° C.

8. The method according to claim 5 wherein the separating of said particles is effected by screening.

9. The method according to claim 5 wherein the scrap material comprises beverage cans and wherein the constituents of different materials comprise alloys of aluminum and manganese.

* * * * *

UNITED STATES PATENT AND TRADEMARK OFFICE
CERTIFICATE OF CORRECTION

PATENT NO. : 5,054,747
DATED : October 8, 1991
INVENTOR(S) : Ophneil H. Perry

It is certified that error appears in the above-identified patent and that said Letters Patent is hereby corrected as shown below:

Title page:
In the Abstract, line 5, change "larger" to -- large --; line 10, change "screen" to -- screening --; change "larger" to -- large --; line 12, change "cn" to -- can --.

Column 1, line 17, after "claimed" insert -- in our --; line 20, change "storing" to -- sorting --.

Column 2, line 62, change "then" to -- them --.

Column 4, line 15, change "helping" to -- heating --.

Signed and Sealed this

Twenty-third Day of February, 1993

*Attest:*

STEPHEN G. KUNIN

*Attesting Officer*   Acting Commissioner of Patents and Trademarks